(12) United States Patent
Grois et al.

(10) Patent No.: US 6,315,590 B1
(45) Date of Patent: Nov. 13, 2001

(54) FLOATING PANEL MOUNTED CONNECTOR ASSEMBLY

(75) Inventors: Igor Grois, Northbrook; Yuriy Belenkiy, Niles; B. Daniel Szilagyi, Downers Grove, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/541,207

(22) Filed: Apr. 3, 2000

(51) Int. Cl.[7] .................................................... H01R 13/64
(52) U.S. Cl. ........................... 439/248; 439/353; 439/355
(58) Field of Search .................... 385/901.1, 58, 385/53, 54, 55, 56, 57, 60, 69, 72; 348/359, 804; D26/27; 439/247, 248, 357, 358, 352, 353, 354, 355

(56) References Cited

U.S. PATENT DOCUMENTS

| | | | |
|---|---|---|---|
| 4,718,857 | * | 1/1988 | Noschese ............................. 439/292 |
| 5,183,410 | * | 2/1993 | Inaba et al. .......................... 439/489 |
| 5,259,052 | * | 11/1993 | Briggs et al. .......................... 385/78 |
| 5,382,177 | * | 1/1995 | Hutchinson et al. ................. 439/358 |
| 5,598,495 | * | 1/1997 | Rittle et al. ............................ 385/75 |
| 5,619,604 | * | 4/1997 | Shiglett et al. ........................ 385/59 |
| 5,788,522 | * | 8/1998 | Kameyama .......................... 439/248 |
| 5,960,138 | | 9/1999 | Shimoji et al. ........................ 385/58 |
| 5,971,625 | * | 10/1999 | Lu ......................................... 385/60 |
| 6,033,125 | * | 3/2000 | Stillie et al. ........................... 385/75 |
| 6,041,155 | * | 3/2000 | Anderson et al. .................... 385/139 |
| 6,079,881 | * | 6/2000 | Roth ....................................... 385/76 |
| 6,105,088 | * | 8/2000 | Pascale et al. ....................... 710/100 |

* cited by examiner

Primary Examiner—Tulsidas Patel
Assistant Examiner—Charles J Peschel

(57) ABSTRACT

A connector assembly is mounted through an aperture in a panel, the aperture defining an axis. A first connecting device is mountable in the aperture in the panel. A second connecting device is insertable axially into the first connecting device. One of the connecting devices includes two portions relatively movable axially, with one portion being mateable with the other connecting device. A first latch is provided between the two portions of the one connecting device to prevent relative axial movement therebetween. A second latch is provided between the other connecting device and the one portion of the one connecting device when the other connecting device is mated therewith. A release is provided on the other connecting device for releasing the first latch between the two portions of the one connecting device to allow the mated other connecting device to float relative to the panel.

23 Claims, 7 Drawing Sheets

FLOATING PANEL MOUNTED CONNECTOR ASSEMBLY

FIELD OF THE INVENTION

This invention generally relates to the art of connector assemblies and, particularly, a connector assembly for mounting through an aperture in a panel and having floating movement relative to the panel.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an aperture in a panel, backplane, circuit board or the like. The adapter may be mounted on a printed circuit board such as a motherboard, and one of the connectors received by the adapter may be mounted to a daughterboard.

When the adapter and connector assemblies are mounted through an aperture in a panel, it often is desirable to mount the connector assembly so that it has some degree of limited movement or "float" relative to the panel or other chassis. For instance, the chassis or panel and its mounted connector may be assembled in relation to another frame component or a printed circuit board, backplane or the like. By providing some degree of floating movement for the connector, accommodation is made for manufacturing tolerances when the entire system is assembled.

On the other hand, if a connector is mounted in a panel with floating movement relative thereto, it often is difficult to mate a complementary connector with the panel-mounted connector because the panel-mounted connector shifts around due to its floating movement. The present invention is directed to a new and improved latch-release system wherein an adapter and a panel-mounted connector is fixed against any floating movement relative to the panel to allow easy mating of a second connector, and the panel-mounted connector is released upon mating to allow limited floating movement of the connector assembly relative to the panel. Of course, the concepts of the invention are not limited to this particular adapter/connector arrangement.

SUMMARY OF THE INVENTION

An object, therefore, of the invention is to provide a new and improved connector assembly for mounting through an aperture in a panel, the aperture defining an axis, and the assembly providing for floating movement when the connector arrangement is fully mated.

In the exemplary embodiment of the invention, the connector assembly includes a first connecting device mountable in the aperture in the panel. A second connecting device is insertable axially into the first connecting device. One of the connecting devices includes two portions relatively movable in an axial direction, with one portion being mateable with the other of the connecting devices. Complementary interengaging first latch means are provided between the two portions of the one connecting device to prevent the relative axial movement therebetween. Complementary interengaging second latch means are provided between the other of the connecting devices and the one portion of the one connecting device when the other connecting device is mated therewith. Release means are provided on the other of the connecting devices for releasing the first latch means between the two portions of the one connecting device to allow the mated other connecting device to float relative to the panel.

As disclosed herein, the complementary interengaging first latch means include at least one flexible latch arm on the one relatively movable portion of the one connecting device engageable with a latch member on the other portion. Preferably, a pair of the flexible latch arms and respective latch member are provided on opposite sides of the connector assembly. A pair of the latch members are spaced axially of the other portion of the one connecting device for each flexible latch arm and between which the latch arm floats when the connecting devices are mated.

The complementary interengaging second latch means comprise at least one flexible latch arm on the other of the connecting devices engageable with a latch member on the one relatively movable portion of the one connecting device. Generally, the invention contemplates that the release means and the second latch means comprise a single component. Therefore, the flexible latch arm on the other connecting device includes a portion thereof defining the release means for engaging and releasing the first latch means. As disclosed herein, the flexible latch arm includes a chamfered distal end for engaging and releasing the first latch means generally transversely of the axis. The flexible latch arm includes a latch hook spaced axially of the chamfered distal end for engaging the latch member on the one relatively movable portion of the one connecting device.

The first connecting device is shown herein in the form of a two-part adapter mountable in the aperture in the panel. The second connecting device is fixed to a substrate such as a printed circuit board. However, the invention is not limited to this precise connector assembly.

Other objects, features and advantages of the invention will be apparent from the following detailed description taken in connection with the accompanying drawings.

BRIEF DESCRIPTIONS OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
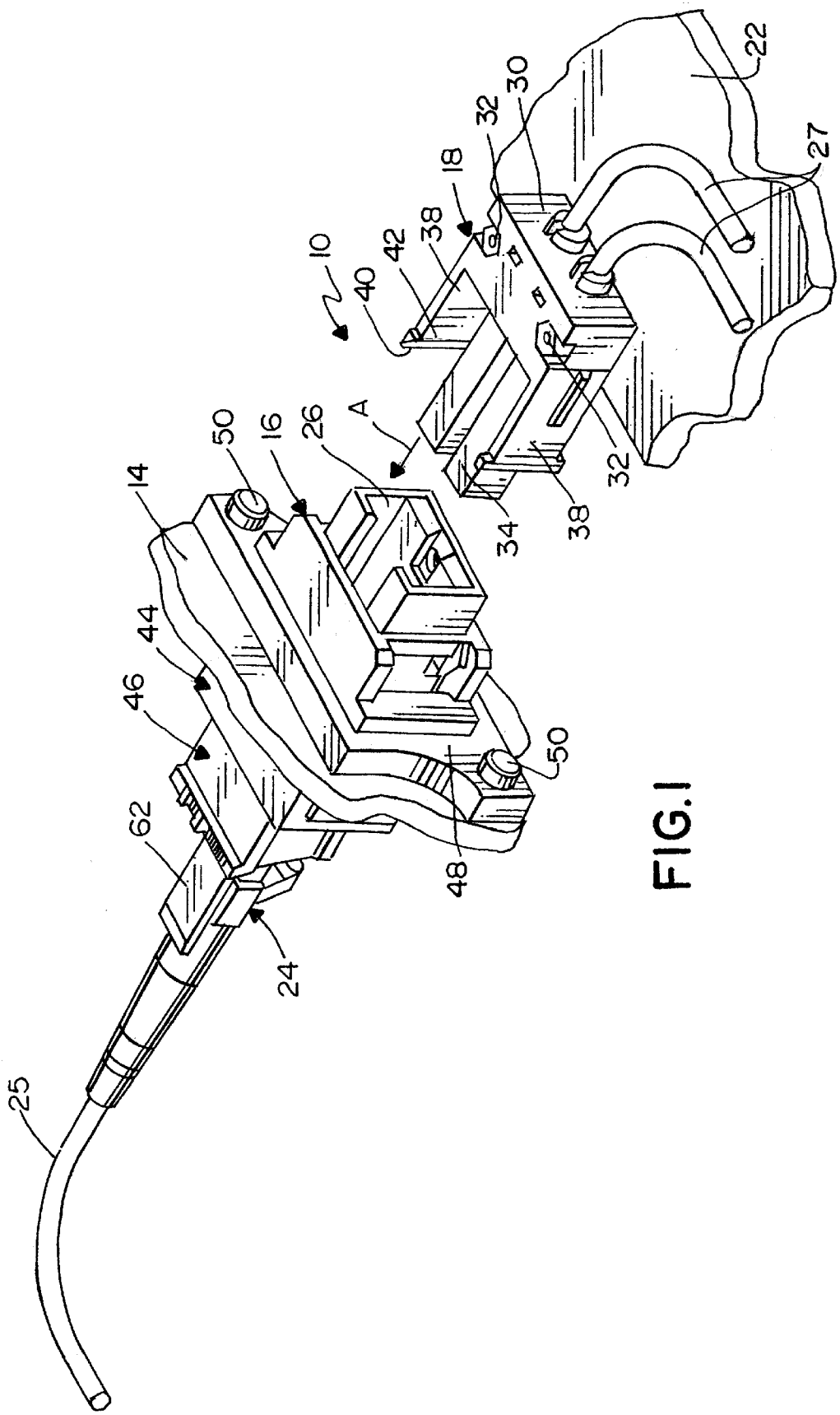
FIG. 1 is perspective view of a connector assembly incorporating the concepts of the invention, with the connecting devices of the assembly in unmated condition.
Figure 2:
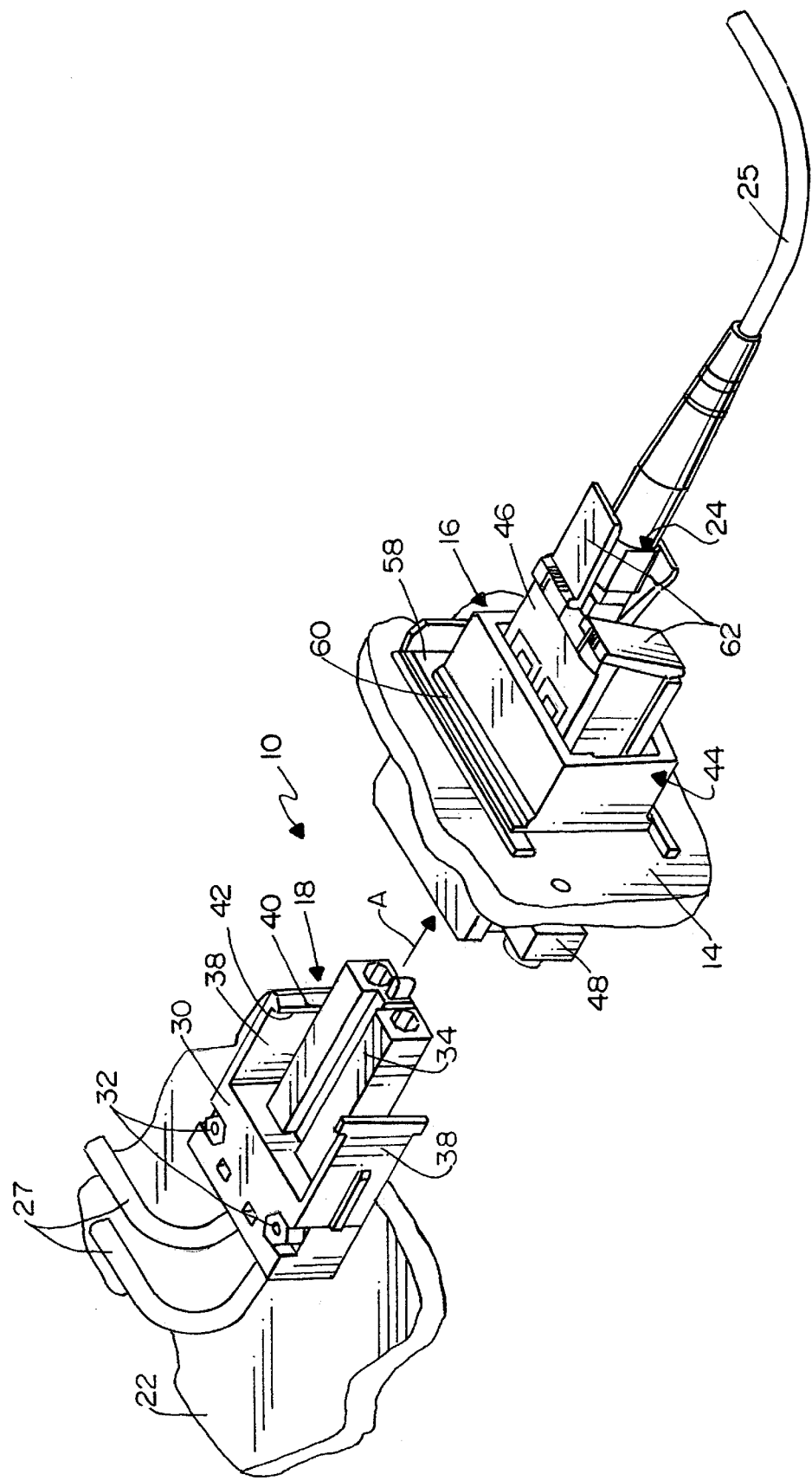
FIG. 2 is a perspective view similar to that of FIG. 1, looking in the opposite direction of FIG. 1.
Figure 3:
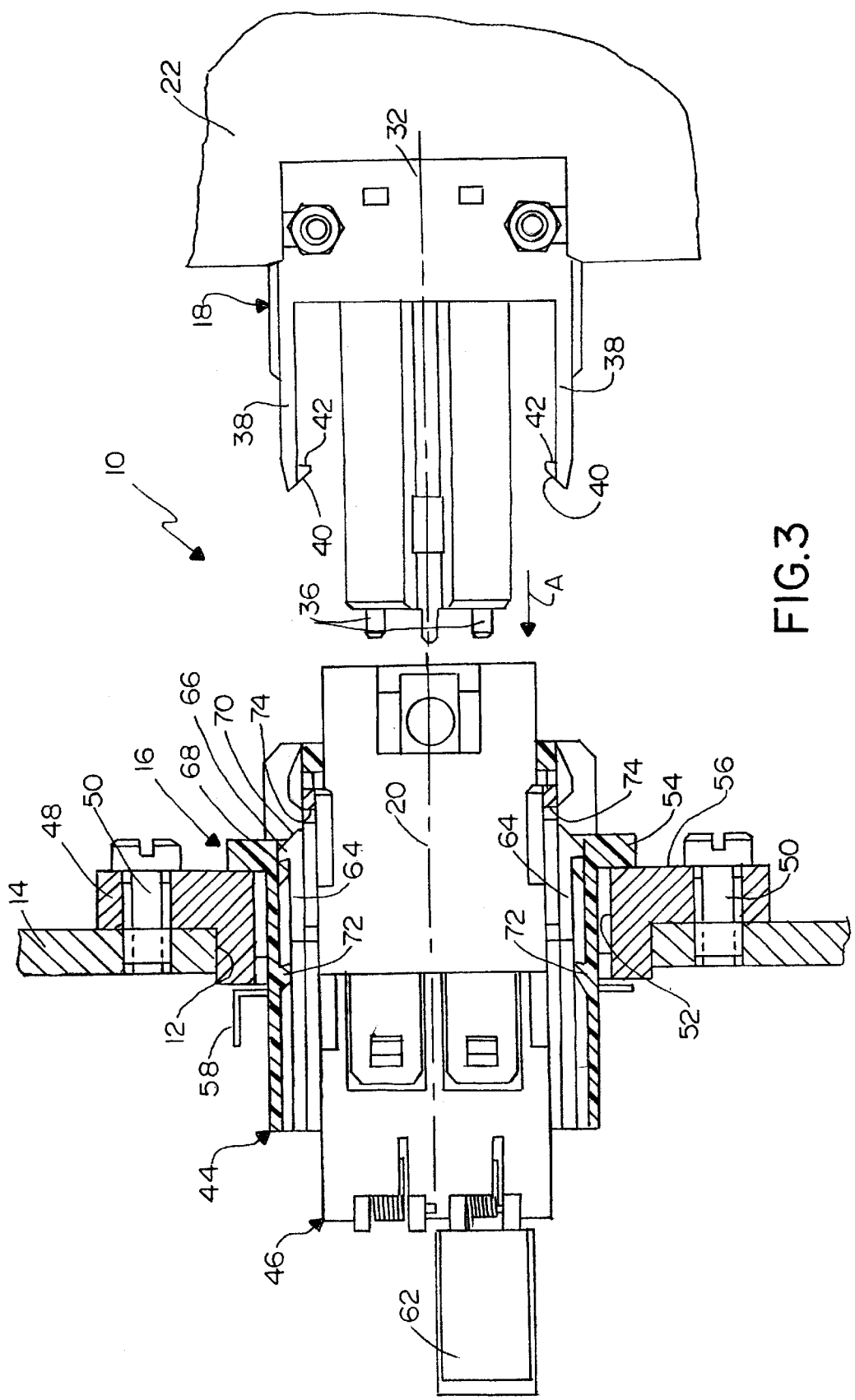
FIGS. 3–7 are axial sections through the connector assembly showing sequential positions of the connecting devices during mating thereof.

Referring to the drawings in greater detail, and first to FIGS. 1–3, the invention is embodied in a connector assembly, generally designated 10, for mounting through an aperture 12 (FIG. 3) in a panel 14. The panel may be a printed circuit board and, in the connector scheme shown herein, would be considered the "mother" board. Generally, connector assembly 10 includes a first connecting device, generally designated 16, and a second connecting device, generally designated 18. The first connecting device is mountable in aperture 12 in panel 14 on an axis 20 (FIG. 3) defined by the aperture. The second connecting device is mounted on a second printed circuit board 22 and is insertable axially into the first connecting device in the direction of arrow "A". Printed circuit board 22 would be considered the "daughter" board in the connector scheme herein.

First connecting device 16 is shown herein in the form of a two-part adapter, and second connecting device 18 is shown herein in the form of a connector, particularly a fiber optic connector. Adapter 16 receives a pair of fiber optic connector modules, generally designated 24, inserted into the rear of the adapter for mating with connector 18 inserted into a front receptacle 26 (FIG. 1) of the adapter. Connector modules 24 are terminated to fiber optic cables 25 and connector 18 is terminated to fiber optic cables 27. However, it should be understood that the concepts of the invention are equally applicable and useful for other types of connector assemblies. For instance, fiber optic connector 18 could be an electrical connector terminated to discrete electrical wires, and connector modules 24 also could be electrical connectors terminated to electrical cables. In addition, as will be described hereinafter, adapter 16 is a two-part adapter including an outer adapter part and a relatively movable inner adapter part. Connector modules 14 are inserted into the inner adapter part. However, the inner adapter part equally could be a connector, itself, inside a one-piece adapter for mating with connector 18.

With that understanding, fiber optic connector 18 includes a housing 30 fixed to daughter board 22 by means of a pair of fasteners, such as a pair of bolts 32. The housing has a forwardly projecting mating portion 34 which is insertable into receptacle 26 of adapter 16 in the direction of arrows "A". Fiber optic cables 27 have inner fiber cores (not visible in the drawings) which are terminated in a pair of ferrules 36 (FIG. 3) which project forwardly beyond mating portion 34. Housing 32 may be fabricated of plastic material, and a pair of flexible latch arms 38 project forwardly of the housing spaced laterally outwardly of mating portion 34. Each latch arm terminates in a chamfered distal end 40 with a latch hook 42 spaced immediately behind the chamfered distal end. As will be described and understood hereinafter, latch arms 38 perform a dual function of latching with the inner, floating adapter part as well as releasing the first latch means between the adapter parts which prevent such floating.

Adapter 16 includes an outer adapter part, generally designated 44, and a relatively movable inner adapter part, generally designated 46. The entire adapter is mounted within a mounting bracket 48 which, in turn, is mounted within aperture 12 in panel 14 as best seen in FIG. 3. Bracket 48 is fixed rigidly to the panel by means of a pair of fasteners, such as bolts 50. Adapter 16 is mounted within an aperture 52 in bracket 48 as best seen in FIG. 3. Outer adapter part 44 has an outwardly projecting flange 54 which abuts against a front face 56 of the adapter. A generally U-shaped retention clip 58 is inserted laterally into a pair of grooves 60 (FIG. 2) on the outside of outer adapter part 44. The retention clip bears against the backside of bracket 48 and combines with flange 54 of the outer adapter part to hold the two-part adapter 16 within aperture 52 in mounting bracket 48. Finally, a pair of spring-loaded doors or shutters 62 close the rear of inner adapter part 46 unless one or both of connector modules 24 are inserted into the rear of the adapter. One of the doors is shown open (i.e., without the respective connector module) in FIGS. 3–7 simply to facilitate the illustration.

Generally, complementary interengaging first latch means are provided between inner and outer adapter parts 46 and 44, respectively, to prevent relative axial movement therebetween. Referring to FIG. 3, inner adapter part 46 includes a pair of flexible latch arms 64 on opposite sides thereof. The latch arms have latch hooks 66 for engaging behind a pair of latch members or bosses 68 on the inside of outer adapter part 44. The outer distal ends of the latch arms are chamfered, as at 70. Therefore, when adapter 16 is in its original unmated condition as shown in FIG. 3, relative axial movement between the two adapter parts is prevented by the interengagement of latch hooks 66 on latch arms 64 with latch members 68. For purposes to be described hereinafter, a second latch member 72 is spaced rearwardly of each latch member 68 to define the limit of floating movement provided by the connector assembly, as will be described.

As stated immediately above, latch arms 64 on inner adapter part 46 and latch members 68 on outer adapter part 44 define the complementary interengaging "first" latch means which prevents relative axial movement between the adapter parts. With that understanding, latch hooks 42 on latch arms 38 of connector 18 form part a complementary interengaging "second" latch means which include a pair of latch shoulders 74 on inner adapter part 46. This interengagement will be described below. Still further, chamfered distal ends 40 of latch arms 38 of connector 18 provide a release means for releasing the first latch means of the two-part adapter.

Figure 4:
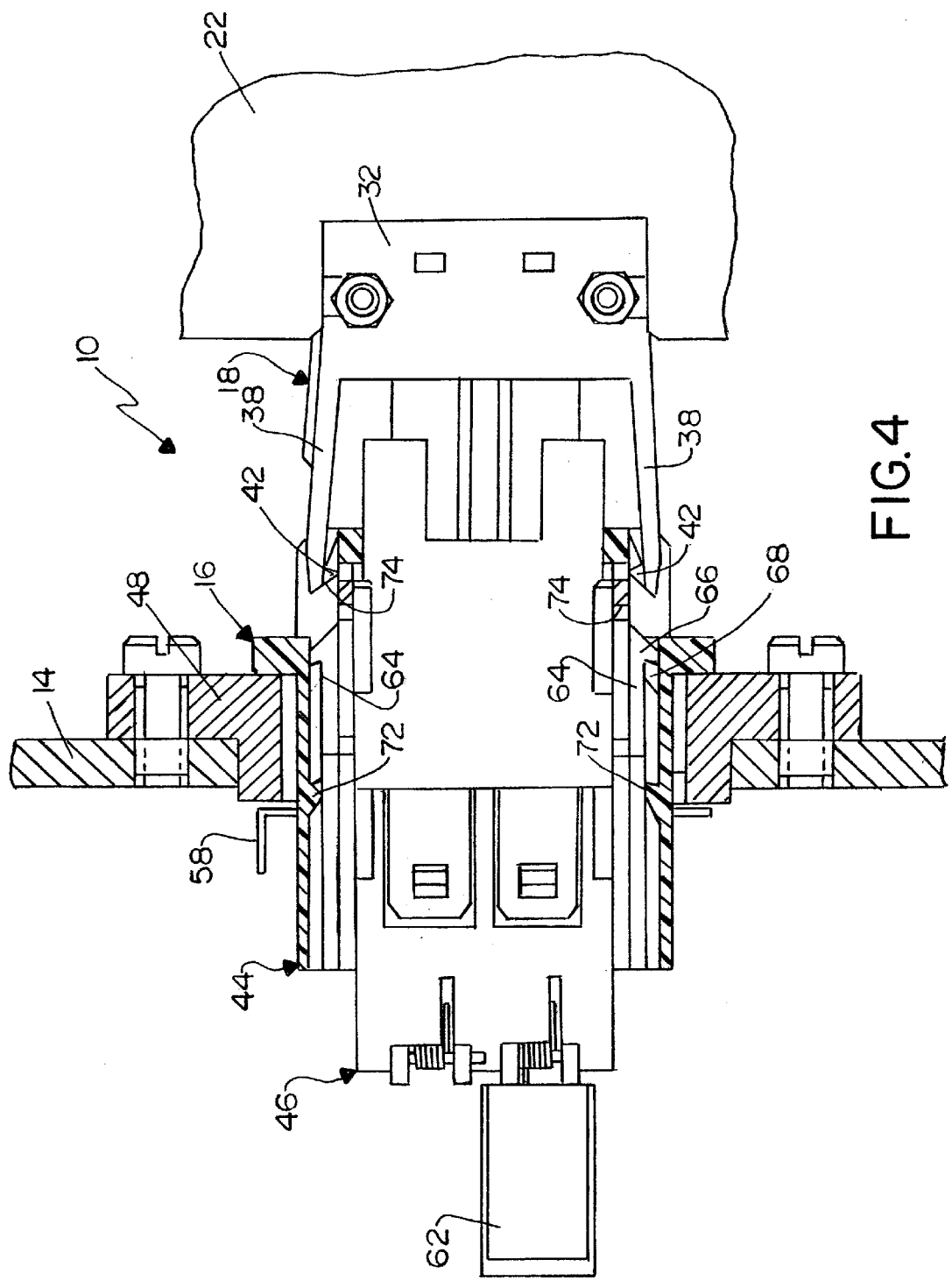

The operation of connector assembly 10 now will be described. Mother board 14 typically is a larger fixed structural component, with adapter 16 mounted thereon (i.e., within mounting bracket 48). Connector 18 and daughter board 22 are moved into mating engagement with the adapter in the direction of arrow "A" (FIG. 3) until latch hooks 42 on flexible latch arms 38 of connector 18 come into engagement with latch shoulders 74 of inner adapter part 46 as seen in FIG. 4. With distal ends 40 of latch arms 38 being chamfered, the distal ends will engage the front end of the inner adapter part to bias the latch arms outwardly until latch hooks 42 snap back inwardly into engagement with latch shoulders 74 as seen in FIG. 4.

Figure 5:
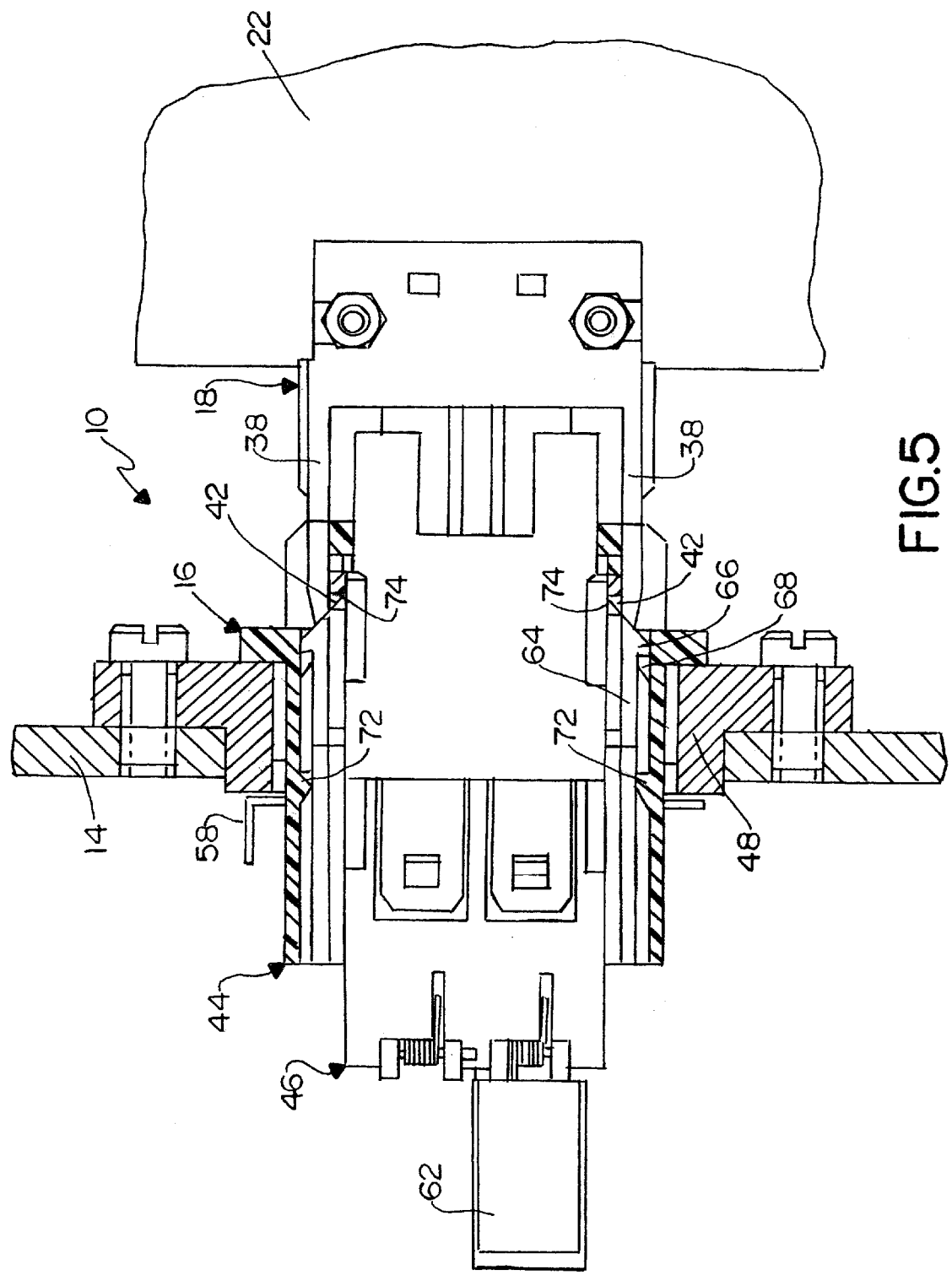
Figure 6:
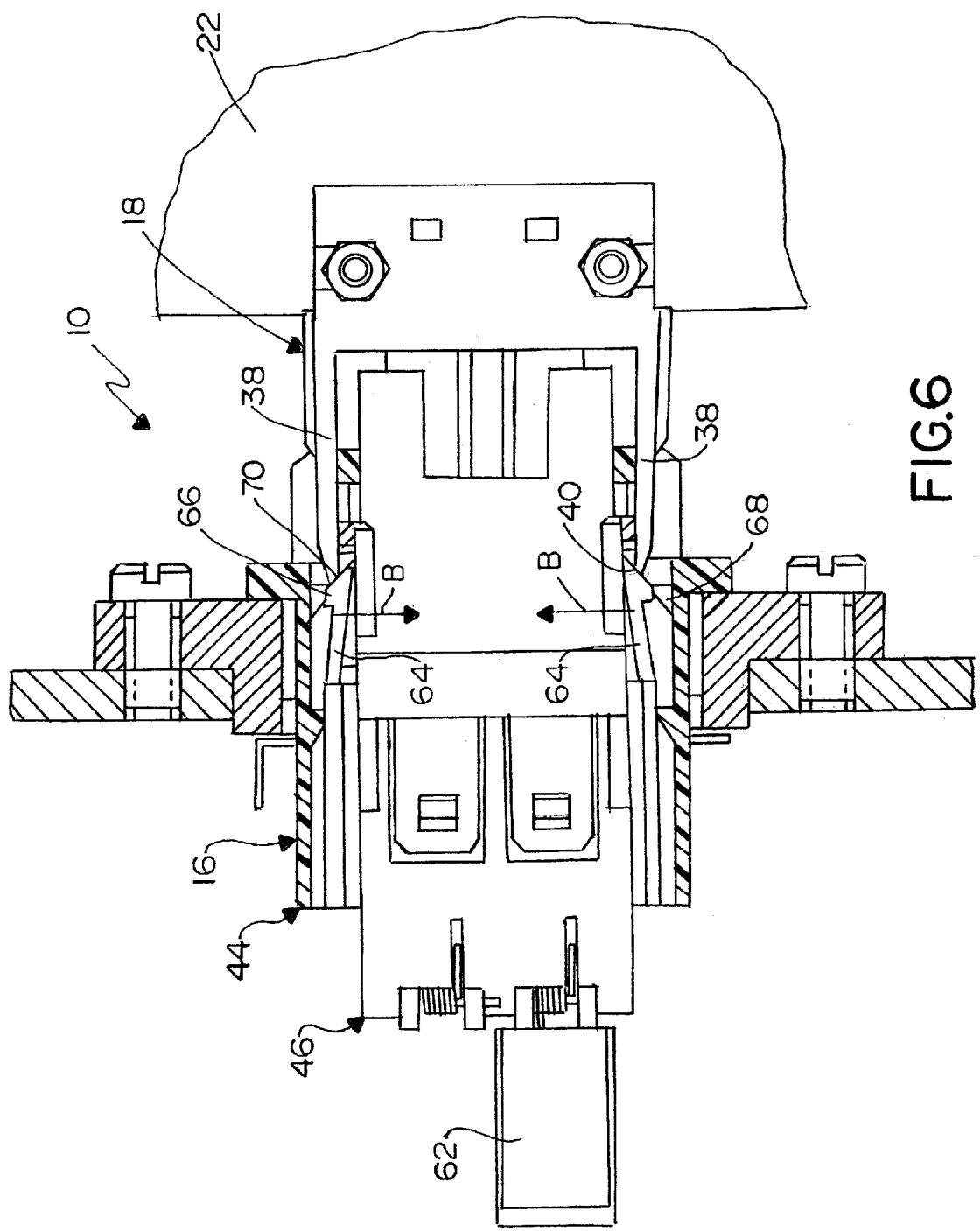

Although the next action happens practically instantaneously, chamfered distal ends 40 of latch arms 38 of connector 18 then come into engagement with chamfered distal ends 70 of latch arms 64 of inner adapter part 46 as seen in FIG. 5. This causes latch arms 64 on the inner adapter part to move in the direction of arrows "B" out of engagement with latch members 68 on the inside of outer adapter part 44 as seen in FIG. 6. In other words, latch arms 38 of connector 18 are effective to release the "first" latch means between the two adapter parts while the "second" latch means between connector 18 and the inner adapter part remain in engagement as seen in FIG. 6.

Figure 7:
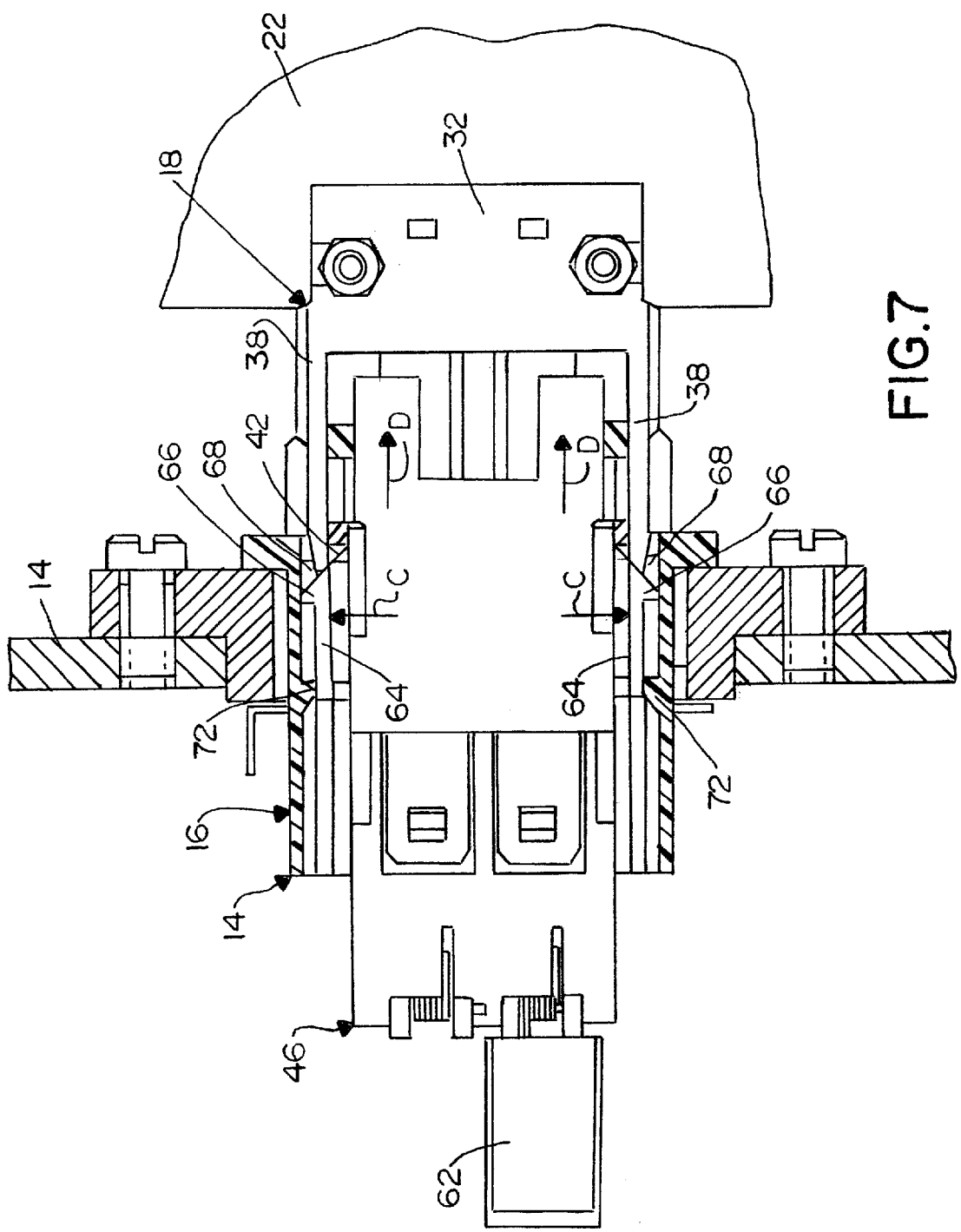

FIG. 7 shows that latch arms 64 of inner adapter part 46 have now snapped back outwardly in the direction of arrow "C", whereby latch hooks 66 of the latch arms now are disposed between axially spaced latch members 68 and 72 on the inside of the outer adapter part. The mated combination of connector 18 (and daughter board 22) and inner adapter part 46 (along with connector modules 24) now can float relative to outer adapter part 44 and panel 14 within the limits of latch hooks 66 moving in the direction of double-headed arrows "D" between latch members 68 and 72.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A connector assembly for mounting through an aperture in a panel, the aperture defining an axis, comprising:

a first connecting device mountable in the aperture in the panel;

a second connecting device insertable axially into the first connecting device;

one of said connecting devices including two portions relatively movable axially, with one portion being mateable with the other of said connecting devices;

complementary interengaging first latch means between said two portions of the one connecting device to prevent said relative axial movement therebetween;

complementary interengaging second latch means between the other of said connecting devices and said one portion of the one connecting device when the other connecting device is mated therewith;

release means on the other of said connecting devices for releasing the first latch means between said two portions of the one connecting device to allow the mated other connecting device to float relative to the panel; and said release means and the second latch means on the other of said connecting devices comprising a single component.

2. The connector assembly of claim 1 wherein said complementary interengaging first latch means comprise at least one flexible latch arm on said one relatively movable portion of the one connecting device engageable with a latch member on the other portion.

3. The connector assembly of claim 2, including a pair of said flexible latch arms and respective latch members on opposite sides of the connector assembly.

4. The connector assembly of claim 2, including a pair of said latch members spaced axially of the other portion of the one connecting device and between which said flexible latch arm floats when the connecting devices are mated.

5. The connector assembly of claim 1 wherein said complementary interengaging second latch means comprise at least one flexible latch arm on the other of said connecting devices engageable with a latch member on said one relatively movable portion of the one connecting device.

6. The connector assembly of claim 5 wherein said flexible latch arm includes a portion thereof defining said release means for engaging and releasing the first latch means.

7. The connector assembly of claim 6 wherein said flexible latch arm includes a chamfered distal end for engaging and releasing the first latch means generally transversely of said axis.

8. The connector assembly of claim 7 wherein said flexible latch arm includes a latch hook spaced axially of said chamfered distal end for engaging the latch member on said one relatively movable portion of the one connecting device.

9. The connector assembly of claim 5, including a pair of said flexible latch arms and respective latch members on opposite sides of the connector assembly.

10. The connector assembly of claim 1 wherein said second connecting device is fixed to a substrate.

11. The connector assembly of claim 1 wherein said first connecting device mountable in the aperture in the panel comprises said one of the connecting devices including the two relatively movable portions.

12. A connector assembly for mounting through an aperture in a panel, the aperture defining an axis, comprising:

a two-part adapter mountable in the aperture in the panel, including a fixed part fixed to the panel and a movable part relatively movable axially in the fixed part, the movable part being adapted for receiving a connector module;

a connector insertable axially into the movable part of the adapter for mating with said connector module;

complementary interengaging first latch means between the two parts of the adapter to prevent said relative axial movement therebetween;

complementary interengaging second latch means between the connector and the movable part of the adapter when the connector is inserted thereinto;

release means on the connector for releasing the first latch means between the two relatively movable parts of the adapter to allow the connector and the movable part to float relative to the panel and the fixed part; and said release means and the second latch means on the connector comprising a single component.

13. The connector assembly of claim 12 wherein said complementary interengaging first latch means comprise at least one flexible latch arm on the movable part of the adapter engageable with a latch member on the fixed part of the adapter.

14. The connector assembly of claim 13, including a pair of said flexible latch arms and respective latch members on opposite sides of the connector assembly.

15. The connector assembly of claim 13, including a pair of said latch members spaced axially of the fixed part of the adapter and between which the flexible latch arm floats when the connector is mated with the movable part of the adapter.

16. The connector assembly of claim 12 wherein said complementary interengaging second latch means comprise at least one flexible latch arm on the connector engageable with a latch member on the movable part of the adapter.

17. The connector assembly of claim 16 wherein said flexible latch arm includes a portion thereof defining said release means for engaging and releasing the first latch means.

18. The connector assembly of claim 17 wherein said flexible latch arm includes a chamfered distal end for engaging and releasing the first latch means generally transversely of said axis.

19. The connector assembly of claim 18 wherein said flexible latch arm includes a latch hook spaced axially of said chamfered distal end for engaging the latch member on the movable part of the adapter.

20. The connector assembly of claim 16, including a pair of said flexible latch arms and respective latch members on opposite sides of the connector assembly.

21. The connector assembly of claim 12 wherein said connector is fixed to a substrate.

22. A connector assembly for mounting through an aperture in a panel, the aperture defining an axis, comprising:

a first connecting device mountable in the aperture in the panel;

a second connecting device insertable axially into the first connecting device;

one of said connecting devices including two portions relatively movable axially, with one portion being mateable with the other of said connecting devices;

complementary interengaging first latch means between said two portions of the one connecting device to prevent said relative axial movement therebetween, said first latch means including at least one flexible latch arm on one relatively movable portion of the one connecting device engageable with one of a pair of latch members on the other portion, the pair of latch members being spaced axially of the other portion of the one connecting device and between which the flexible latch arm can float when the connecting devices are mated;

complementary interengaging second latch means between the other of said connecting devices and said one portion of the one connecting device when the other connecting device is mated therewith; and release means on the other of said connecting devices for releasing the first latch means between said two portions of the one connecting device to allow the mated other connecting device to float relative to the panel.

23. A connector assembly for mounting through an aperture in a panel, the aperture defining an axis, comprising:

a two-part adapter mountable in the aperture in the panel, including a fixed part fixed to the panel and a movable part relatively movable axially in the fixed part, the movable part being adapted for receiving a connector module;

a connector insertable axially into the movable part of the adapter for mating with said connector module;

complementary interengaging first latch means between the two parts of the adapter to prevent said relative axial movement therebetween, said first latch means including at least one flexible latch arm on the movable part of the adapter engageable with one of a pair of latch members on the fixed part of the adapter, the pair of latch members being spaced axially of the fixed part of the adapter and between which the flexible latch arm can float when the connector is mated with the movable part of the adapter;

complementary interengaging second latch means between the connector and the movable part of the adapter when the connector is inserted thereinto; and release means on the connector for releasing the first latch means between the two relatively movable parts of the adapter to allow the connector and the movable part to float relative to the panel and the fixed part.

\* \* \* \* \*